J. LEVEY.
PIPE CLAMP.
APPLICATION FILED MAR. 7, 1914.
1,114,273.
Patented Oct. 20, 1914.
2 SHEETS—SHEET 1.
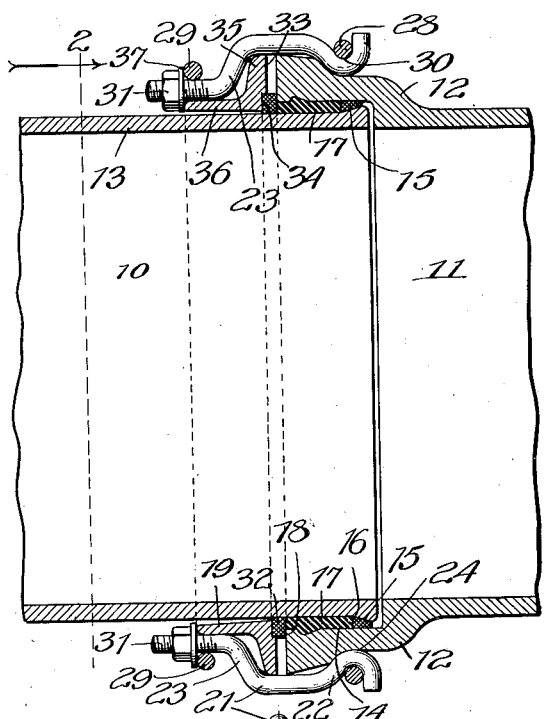
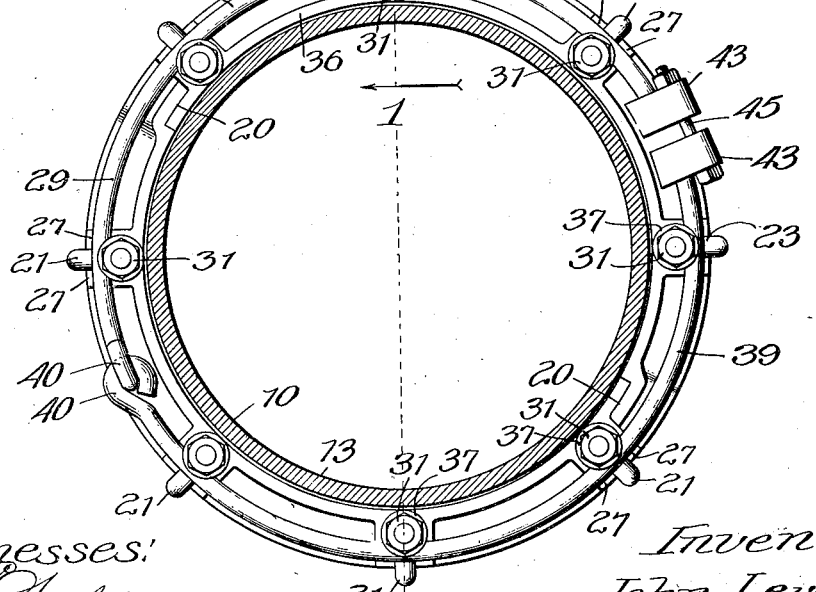
Inventor:
John Levey,

J. LEVEY.
PIPE CLAMP.
APPLICATION FILED MAR. 7, 1914.

1,114,273.

Patented Oct. 20, 1914.
2 SHEETS—SHEET 2.

Witnesses:

Inventor:
John Levey,

UNITED STATES PATENT OFFICE.

JOHN LEVEY, OF CHICAGO, ILLINOIS, ASSIGNOR TO NATIONAL MACHINE WORKS, OF CHICAGO, ILLINOIS, A CORPORATION OF ILLINOIS.

PIPE-CLAMP.

1,114,273.  Specification of Letters Patent.  Patented Oct. 20, 1914.

Application filed March 7, 1914. Serial No. 823,131.

*To all whom it may concern:*

Be it known that I, JOHN LEVEY, a citizen of the United States, residing at Chicago, in the county of Cook and State of Illinois, have invented a new and useful Improvement in Pipe-Clamps, of which the following is a specification.

My invention relates to clamping means for rendering the joints between pipes water and gas-tight, which are usually employed as supplemental to the usual joint-packing, for preventing leakage should this packing become impaired, my invention having been devised more particularly for use in connection with pipes having bell and spigot joints.

My object is to provide a novel, simple and inexpensive form of clamp which may be readily applied to a pipe and which will operate to insure the maintenance of a tight joint.

Figure 3:
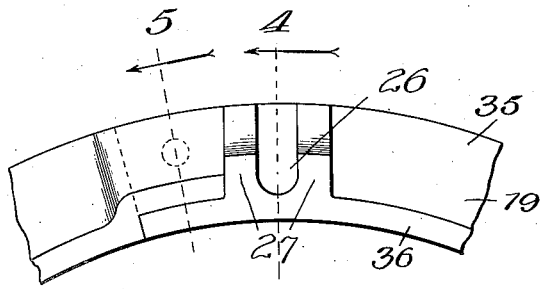
Figure 4:
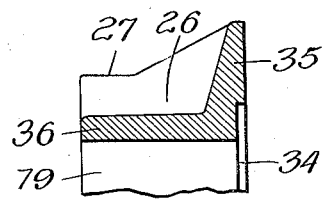
Figure 6:
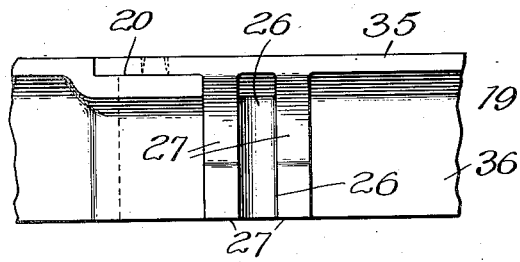
Figure 5:
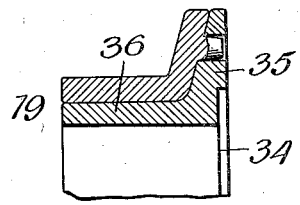
Figure 7:
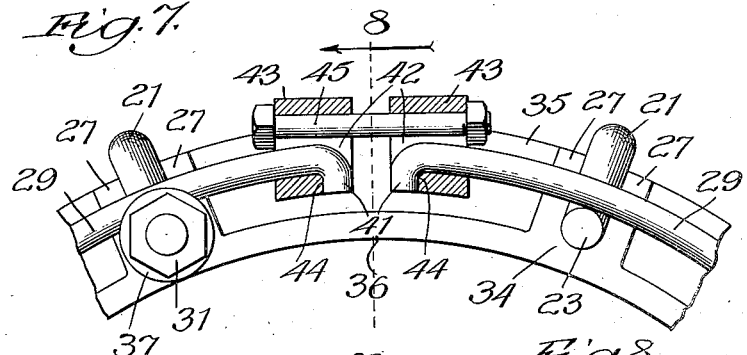
Figure 8:
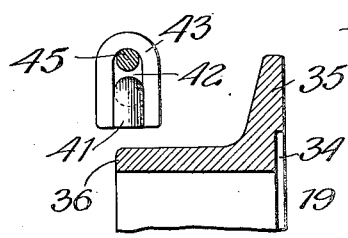

Referring to the accompanying drawings Figure 1 is a broken view in vertical elevation of two pipes having a bell and spigot connection and equipped with my improved clamp, this section being taken at the line 1 on Fig. 2 and viewed in the direction of the arrow. Fig. 2 is a section taken at the line 2 on Fig. 1 and viewed in the direction of the arrow. Fig. 3 is a face view of a portion of the packing-engaging ring of my improved clamp. Figs. 4 and 5 are sections taken at the lines 4 and 5, respectively, on Fig. 3 and viewed in the direction of the arrows. Fig. 6 is a plan view of the structure shown in Fig. 3. Fig. 7 is a face view of the clamping means of Fig. 1 showing portions thereof in section; and Fig. 8, a section taken at the line 8 on Fig. 7 and viewed in the direction of the arrow.

My invention is shown as applied to a joint between two pipes 10 and 11 of the bell-jointed type, the pipe 11 having a bell-section 12 into which the spigot section 13 of the pipe 10 extends and is spaced therefrom throughout its periphery to afford a chamber 14 between the bell and spigot, which in practice is packed with any suitable packing, usually with hemp, illustrated at 15, up to the line 16, and lead 17, flush with the outer surface 18 of the bell 12, the lead being poured into the chamber 14 upon the packing 15, while in molten condition.

While the pipes 10 and 11 maintain their alinement, the packing just described is sufficient to maintain the joint between them in water-tight and gas-tight condition. Should these pipes, however, become out of alinement, the lead packing which is inelastic permanently deforms causing the joint to leak, and it is to repair joints which have thus become leaky that I provide my improved clamp, which may be applied to the joint when the pipes are installed or applied thereto after leakage occurs, as desired.

My improved clamping device comprises a ring 19 preferably formed in halves as illustrated, the dividing line of these parts being represented at 20, this ring being adapted to loosely encircle the spigot 13; a circular series of bolt rods 21, which oppose both the bell and spigot ends of the pipes, these rods paralleling the pipes, the opposed ends of these rods being deflected, as represented at 22 and 23, to engage at their deflected portions 22 with the reduced end 24 of the bell 12, and to extend at their deflected portions 23, which are threaded as represented at 25, into the spaces 26 provided between the spaced webs 27 formed on the ring 19 at intervals about its periphery, in the construction shown eight of these pairs of lugs being provided; and ring devices 28 and 29, the ring 28 fitting in recesses 30 in the outer sides of the bars 21 for preventing the latter from being pulled off the bell-end 24 of the pipe, and the ring 29 encircling the end of the ring 19 and the threaded ends 25 of the bars 21 for preventing the bars 21 from tilting upwardly at their threaded ends when the nuts 31 thereon are screwed tightly into position, as hereinafter described.

The ring 19 coöperates with packing 32 of hemp, or any other suitable packing material, which is applied about the spigot end of the pipe between the end wall 18 of the bell and the face 33 of the ring 19, this face being preferably slightly inset, as represented at 34, the purpose of the clamp being to crowd the packing 32 about the spigot 11, so that any leakage of gas past the packing 15 and 17 will be arrested.

The bars 21 are preferably formed of straight bars of steel, or the like, bent into the form illustrated, the recessed portions 30 being preferably formed by shaping these ends of the bars to present hooks, as illustrated.

The ring 19 is of general L-shape in cross-section as illustrated, affording a circular flange 35 between which and the face 18 of the bell the packing 32 is confined as hereinbefore stated, and an annular flange 36 extending lengthwise of the spigot 10, this flange being preferably relatively thin and the bars 21 being preferably of such shape that they will extend at their outer threaded ends 25 closely adjacent to the flange 36 and thus substantially in line with the packing 32, the threaded ends of these rods preferably carrying washers 37 which bear against the ends of the lugs 27 when the nuts 31 are screwed up tightly.

The bands 28 and 29 may be of any suitable construction. In the construction shown, they are each formed of two sections 38 and 39, each of said sections being formed at one end into a hook 40 and having its other end shouldered, as represented at 41. The shouldered ends of the sections 38 and 39 are adapted to extend through openings 42 in blocks 43 and engage with shoulders 44 on the latter.

The pipe clamp may be applied to the pipe joint in the following manner: The ring 19 is positioned on the spigot 13, as shown, with the packing 32 encircling the spigot and located in the space between the bell and this ring. The bars 21 are then applied to the joint in the position shown in the drawings, and the bands 28 and 29 applied to the bars 21, the operator in applying these bands first hooking together at their hooked ends 40 the sections forming the bands, and thereupon applying the bands to the hooked ends of the bars 21 and the threaded ends thereof, respectively; applying to the shouldered ends 41 of the band sections 38 and 39, the blocks 43, to the position shown in Fig. 7, wherein the shoulders 41 oppose the shoulders 44. Bolts 45 are then inserted through the openings 42 in the opposed blocks 43 and tightened thereon to draw the sections of the bands into rigid engagement with the ends of the bars 21. The operator then screws up the nuts 31 to clamp the ring 19 with the desired pressure against the packing 32.

It will be noted that by deflecting the ends 23 of the bars 21, as shown, the force operating to crowd the ring 19 against the packing 32 is directed against this ring practically in line with the packing 32, and thus tendency to tip the ring 19 in a direction which would render it insufficiently effective for maintaining a tight joint, is reduced to the minimum.

While I have illustrated and described a particular construction embodying my invention, I do not wish to be understood as intending to limit it to the construction illustrated, as the same may be variously modified and altered without departing from the spirit of my invention.

What I claim as new and desire to secure by Letters Patent is—

1. The combination with pipes connected together by a bell and spigot joint, of a member on said spigot-portion, packing between said bell-portion and said member, bars extending lengthwise of said joint, bands engaging said bars at opposite ends of the latter and clamping them about said bell and spigot portions, the band about the ends of said bars overlying the spigot portion, surrounding said member, and means engaging said bars and member for forcing said member toward said bell-portion and against said packing.

2. The combination with pipes connected together by a bell and spigot joint, of a member on said spigot-portion, packing between said bell-portion and said member, bars extending lengthwise of said joint, bands engaging said bars at opposite ends and clamping them about said bell and spigot portions, the band about the ends of said bars overlying the spigot portion, surrounding said member, the ends of said bars adjacent to said spigot being threaded, and nuts screwed upon the threaded ends of said bars and bearing against said member, for the purpose set forth.

3. The combination with pipes connected together by a bell and spigot joint, a ring-member on said spigot-portion, packing interposed between said member and said bell-portion, bars having deflected threaded ends and hook-shaped ends lying adjacent, respectively, to said spigot and bell-portions, bands engaging said bars at their hook-portions and their other ends, respectively, for clamping said bars about said bell and spigot-portions, and nuts screwing upon the threaded ends of said bars and against the said member on said spigot-portion for forcing said last referred to member toward said bell-portion and against said packing.

JOHN LEVEY.

In presence of—
NELLIE B. DEARBORN,
A. C. FISCHER.